(12) United States Patent
Tsukizawa et al.

(10) Patent No.: US 8,983,235 B2
(45) Date of Patent: Mar. 17, 2015

(54) PUPIL DETECTION DEVICE AND PUPIL DETECTION METHOD

(75) Inventors: Sotaro Tsukizawa, Osaka (JP); Kenji Oka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 128 days.

(21) Appl. No.: 13/821,382

(22) PCT Filed: Sep. 22, 2011

(86) PCT No.: PCT/JP2011/005336
§ 371 (c)(1),
(2), (4) Date: Mar. 7, 2013

(87) PCT Pub. No.: WO2012/039139
PCT Pub. Date: Mar. 29, 2012

(65) Prior Publication Data
US 2013/0170754 A1 Jul. 4, 2013

(30) Foreign Application Priority Data

Sep. 24, 2010 (JP) ................................. 2010-213780

(51) Int. Cl.
*G06K 9/32* (2006.01)
*G06K 9/00* (2006.01)
(52) U.S. Cl.
CPC ........ *G06K 9/00597* (2013.01); *G06K 9/00604* (2013.01); *G06K 9/00845* (2013.01)
USPC ........... 382/298; 382/117; 382/118; 382/195; 382/199
(58) Field of Classification Search
None
See application file for complete search history.

(56) References Cited

U.S. PATENT DOCUMENTS 5,573,006 A 11/1996 Shimotani et al.
5,795,306 A 8/1998 Shimotani et al.
(Continued)

FOREIGN PATENT DOCUMENTS

JP 7-249197 A 9/1995
JP 2002-282210 A 10/2002
(Continued)

OTHER PUBLICATIONS

Extended European Search Report issued in Application No. 11 82 6585 dated Jan. 27, 2014.
(Continued)

*Primary Examiner* — Daniel Mariam
*Assistant Examiner* — David Perlman
(74) *Attorney, Agent, or Firm* — Pearne & Gordon LLP

(57) ABSTRACT

Disclosed is a pupil detection device capable improving the pupil detection accuracy even if a detection target image is a low-resolution image. In a pupil detection device (100), an eye area actual size calculation unit (102) acquires an actual scale value of an eye area, a pupil state prediction unit (103) calculates an actual scale prediction value of a pupil diameter, a necessary resolution estimation unit (105) calculates a target value of resolution on the basis of the calculated actual scale prediction value, an eye area image normalization unit (107) calculates a scale-up/scale-down factor on the basis of the calculated target value of resolution and the actual scale value of the eye area, and normalizes the image of the eye area on the basis of the calculated scale-up/scale-down factor, and a pupil detection unit (108) detects a pupil image from the normalized eye area image.

5 Claims, 7 Drawing Sheets

(56) References Cited

U.S. PATENT DOCUMENTS

| | | |
|---|---|---|
| 2003/0068084 A1* | 4/2003 | Kinjo et al. .................. 382/164 |
| 2005/0075973 A1* | 4/2005 | Yousofi ........................ 705/39 |
| 2005/0180611 A1 | 8/2005 | Oohashi et al. |
| 2008/0165187 A1* | 7/2008 | Marugame ................... 345/420 |
| 2010/0194863 A1* | 8/2010 | Lopes et al. .................. 348/50 |
| 2010/0202666 A1* | 8/2010 | Ren et al. ..................... 382/117 |

FOREIGN PATENT DOCUMENTS

| | | |
|---|---|---|
| JP | 2008-090483 A | 4/2008 |
| JP | 2009-080706 A | 4/2009 |
| JP | 2009-282925 A | 12/2009 |

OTHER PUBLICATIONS

Detlev Droege et al. "Pupil Center Detection in Low Resolution Images" Proceedings of the 2010 Symposium on Eye-Tracing Research & Applications, dated Mar. 22, 2010.

International Search Report for PCT/JP2011/005336 dated Nov. 29, 2011.

* cited by examiner

| ACTUAL SIZE PUPIL DIAMETER (mm) | 2.0 | 2.5 | 3.0 | 3.5 | 4.0 | 4.5 | 5.0 | 5.5 | 6.0 | 6.5 | 7.0 | 7.5 | 8.0 |
|---|---|---|---|---|---|---|---|---|---|---|---|---|---|
| NECESSARY RESOLUTION (pixel) | 15 | 15 | 14.5 | 14 | 13 | 12 | 11 | 10 | 9 | 8 | 8 | 8 | 8 |

PUPIL DETECTION DEVICE AND PUPIL DETECTION METHOD

TECHNICAL FIELD

The present invention relates to a pupil detection apparatus and a pupil detection method.

BACKGROUND ART

When a pupil is detected on an image, error detection may occur frequently because resolution in a pupil part is too low. For example, error detection occurs when a field angle of an imaging apparatus is increased for taking a picture of a wide range and resolution in an eye area cannot be secured sufficiently.

In a typical pupil detection method based on an image, there is utilized a first feature that brightness of a pupil part is lower than brightness of a periphery of the pupil part, or a second feature that a pupil has a circular or ellipsoidal shape. However, when resolution cannot be secured sufficiently, sometimes the contour of the pupil on the image has a polygonal shape and does not have the circular or ellipsoidal shape. When the pupil detection is performed in this situation using the above described second feature, error detection occurs frequently. There are many parts each having a low brightness comparable with that of the pupil part on the image around an eye although the shape thereof is not actually circular or ellipsoidal, such as eyelashes, an iris contour, a shadow caused at an eye tail and an eye inner corner, or noise generated when an S/N ratio is poor. Then, when resolution is low, such a part having a low brightness comparable with that of the pupil part is detected erroneously as the pupil, although the shape thereof is different from the shape of the pupil.

For this problem, there has been proposed the following techniques. For example, in a technique disclosed in Patent Literature 1, an eye area is detected from a face image, and zoom processing is performed on the detected eye area. Then, an image of the eye area enlarged so that the edge of a pupil may be observed sufficiently is obtained and thereby a resolution of the pupil necessary for the pupil detection is secured.

Further, there is a technique not for the pupil detection, but as a technique, which is disclosed in Patent Literature 2, for detecting an iris which is a part of an eye. In the technique disclosed in Patent Literature 2, an iris contour is preliminarily detected from an eye area and the image of the eye area is converted so that the iris contour has a circular shape of a predetermined size.

CITATION LIST

Patent Literature

PTL 1
Japanese Patent Application Laid-Open No. 2002-282210
PTL 2
Japanese Patent Application Laid-Open No. 2008-90483

SUMMARY OF INVENTION

Technical Problem

However, in the technique disclosed in Patent Literature 1, the size of the pupil to be detected is not known in the stage of zoom processing for the eye area, and therefore it is difficult to set a zoom scale factor thereof to an optimum value for edge detection to detect the pupil.

Accordingly, for performing the pupil detection stably, it is necessary to always set the zoom scale factor large enough to detect the pupil contour as an edge even when the pupil becomes the smallest (e.g., case of a pupil when light is too bright).

That is, when the zoom scale factor is not large enough, the number of pixels in the edge of the pupil contour part decreases for a small pupil and the pupil detection becomes unstable. Therefore, it is necessary to set the zoom scale factor so that a sufficient number of pixels may be secured in the edge even for the small pupil.

However, when the zoom scale factor is set so that a sufficient number of pixels may be secured in the edge even for the small pupil, the number of edge pixels excessively larger than an essentially required number of edge pixels is detected for a large pupil. In this case, since pixels, the number of which is larger than that required for a detection performance, are to be processed, there arises a problem that a calculation amount is increased for the pupil detection processing.

Further, in the technique disclosed in Patent Literature 2, the iris contour shape on the image is necessary as a conversion parameter when the eye area image is converted. Accordingly, even when this technique is to be applied to the pupil detection processing, a pupil detection result is necessary for the pupil detection and thus it is difficult to apply this technique thereto.

A purpose of the present invention is to provide a pupil detection apparatus and a pupil detection method which can improve pupil detection accuracy even when an image to be detected has a low resolution.

Solution to Problem

A pupil detection apparatus according to one aspect of the present invention is a pupil detection apparatus that detects an image of a pupil, and includes an acquisition section that acquires an actual scale value of a peripheral area including the pupil; a first calculation section that calculates an actual scale prediction value of a pupil diameter; a second calculation section that calculates a target value of resolution on the basis of the calculated actual scale prediction value; a normalization section that calculates a scale-up/scale-down factor on the basis of the calculated target value of the resolution and the actual scale value of the peripheral area, and normalizes an image of the peripheral area on the basis of the calculated scale-up/scale-down factor; and a detection section that detects the image of the pupil from the normalized image of the peripheral area.

A pupil detection method according to one aspect of the present invention is a pupil detection method that detects an image of a pupil, and includes the steps of acquiring an actual scale value of a peripheral area including the pupil; calculating an actual scale prediction value of a pupil diameter; calculating a target value of resolution on the basis of the calculated actual scale prediction value; calculating a scale-up/scale-down factor on the basis of the calculated target value of the resolution and the actual scale value of the peripheral area; normalizing an image of the peripheral area on the basis of the calculated scale-up/scale-down factor; and detecting the image of the pupil from the normalized image of the peripheral area.

Advantageous Effects of Invention

According to the present invention, it is possible to provide a pupil detection apparatus and a pupil detection method which can improve pupil detection accuracy even when an image to be detected has a low resolution.

DESCRIPTION OF EMBODIMENTS

Hereinafter, embodiments of the present invention will be explained in detail with reference to the drawings. Note that, in the embodiments, the same constituent is denoted by the same sign and explanation thereof will be omitted to avoid duplication.

Embodiment 1

Configuration of a Pupil Detection Apparatus

Figure 1:
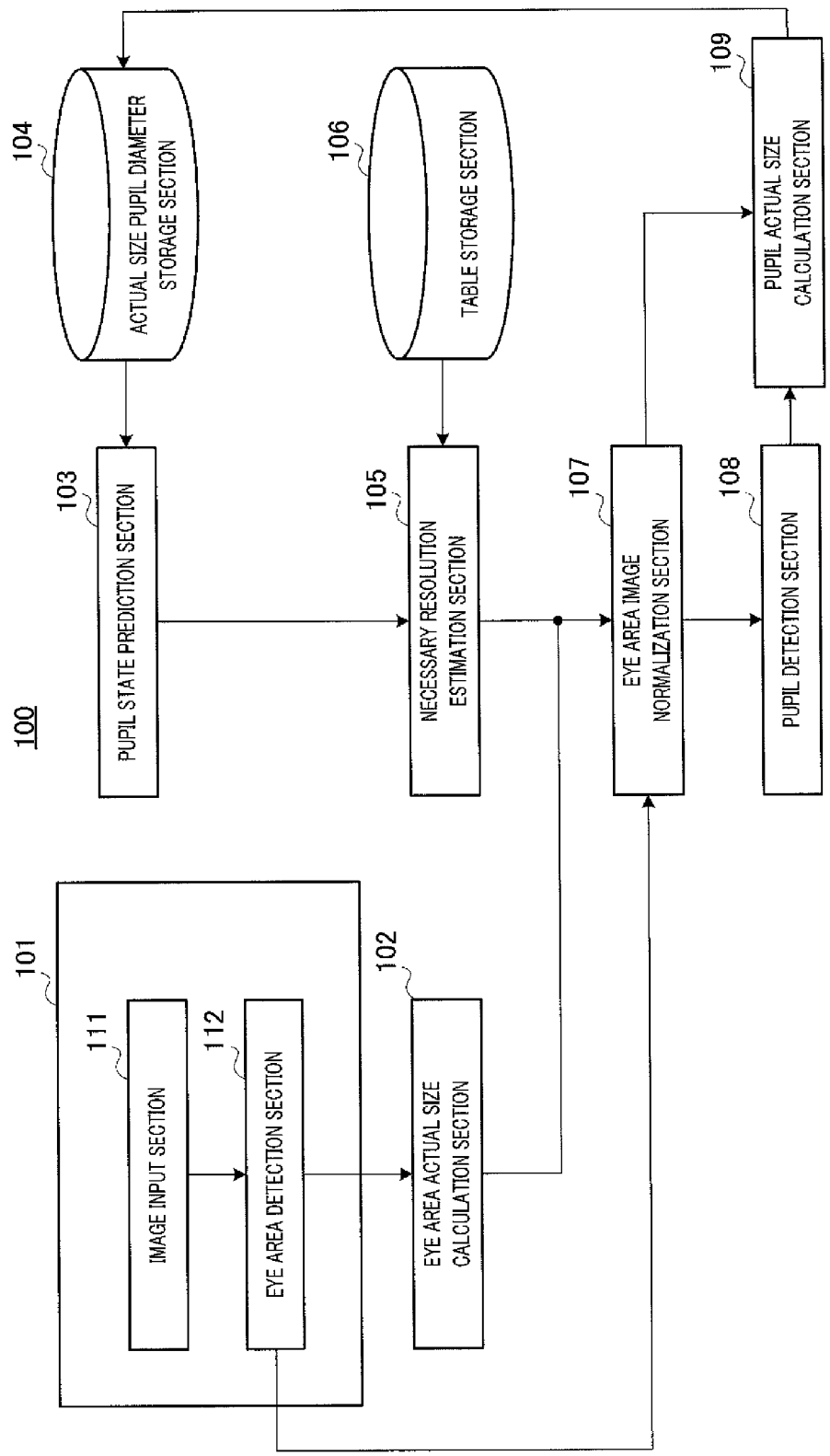
FIG. 1 is a block diagram showing a configuration of a pupil detection apparatus according to Embodiment 1 of the present invention.

FIG. 1 is a block diagram showing a configuration of pupil detection apparatus 100 according to Embodiment 1 of the present invention. Pupil detection apparatus 100 is provided, for example, inside a car and connected to a line-of-sight detection apparatus for use. This line-of-sight detection apparatus determines a pupil position on the basis of a detection result of pupil detection apparatus 100, and detects the line-of-sight direction of a driver. Hereinafter, in particular, there will be explained a case in which pupil detection apparatus 100 is applied to the line-of-sight detection apparatus.

In FIG. 1, pupil detection apparatus 100 includes eye area image acquisition section 101, eye area actual size calculation section 102, pupil state prediction section 103, actual size pupil diameter storage section 104, necessary resolution estimation section 105, table storage section 106, eye area image normalization section 107, pupil detection section 108, and pupil actual size calculation section 109.

Eye area image acquisition section 101 acquires an eye area image and outputs it to eye area actual size calculation section 102.

Specifically, eye area image acquisition section 101 includes image input section 111 and eye area detection section 112.

Image input section 111 captures an image of an imaging target (i.e., person, here). Here, image input section 111 includes a stereo camera and acquires a stereo image with the stereo camera. This target image data is output to eye area detection section 112.

Image input section 111 is disposed at a position in front of a driving seat such as a position on a steering wheel or a dashboard in the car. Thereby, image input section 111 photographs a face of a driver during driving.

Eye area detection section 112 detects an eye area image from the target image acquired from image input section 111.

Figure 2:
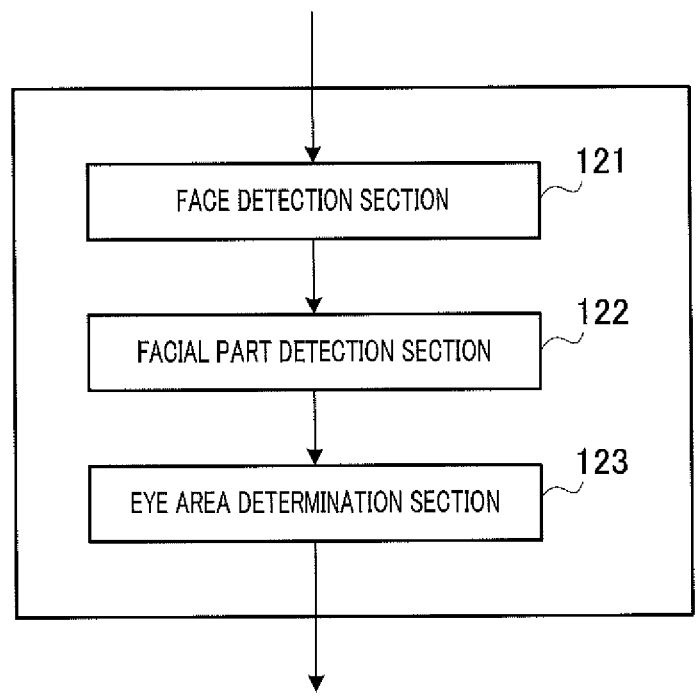
FIG. 2 is a block diagram showing a configuration of an eye area detection section.

Specifically, eye area detection section 112 includes face detection section 121, facial part detection section 122, and eye area determination section 123, as shown in FIG. 2.

Face detection section 121 detects a face image from the target image acquired from image input section 111 and outputs detected face image data to facial part detection section 122.

Facial part detection section 122 detects a facial part group (i.e., mouth corner, eye tail, eye inner corner, etc.) from the face image data acquired from face detection section 121, and outputs positional coordinates of each facial part together with the face image data to eye area determination section 123.

Eye area determination section 123 acquires the positional coordinates of each facial part from facial part detection section 122, and determines a position and sizes (width and height) of an eye area in the face image on the basis of the acquired positional coordinates of each facial part. Then, eye area determination section 123 cuts out an image of the eye area from the face image as an eye area image. The position and sizes of the eye area in the face image are output to eye area actual size calculation section 102 as an eye area detection result together with the eye area image. Note that the position and sizes of the eye area are calculated for each of the right eye and the left eye.

Returning to FIG. 1, eye area actual size calculation section 102 calculates an actual scale value of the eye area on the basis of the eye area image data acquired from eye area image acquisition section 101 (stereo image data in Embodiment 1) and the eye area detection result. The actual scale value of the eye area is a value expressing what actual size the eye area has on the target image. The actual scale value of the eye area is expressed by an actual size (e.g., 30 mm in width or 20 mm in height) of a photographed object (eye peripheral part of the face) as a width or a height of the eye area, or a distance per one pixel on the eye area image (e.g., 0.75 mm per pixel), for example.

Pupil state prediction section 103 calculates an actual scale prediction value of a pupil diameter. Specifically, pupil state prediction section 103 predicts an actual size of a pupil in the eye area image acquired in eye area image acquisition section 101, on the basis of a past actual size pupil diameter retained in actual size pupil diameter storage section 104, and calculates the actual scale prediction value.

Actual size pupil diameter storage section 104 stores a pupil actual size acquired from pupil actual size calculation section 109 together with photographing time. That is, actual size pupil diameter storage section 104 retains a pupil diameter (history thereof) derived from the pupil image acquired in the past by eye area image acquisition section 101.

Necessary resolution estimation section 105 calculates a target value of resolution on the basis of the actual scale prediction value calculated in pupil state prediction section 103. In the calculation of the target value of resolution, a resolution table stored in table storage section 106 is used. In the resolution table, an actual scale value candidate group of the pupil diameter and an image resolution necessary for pupil detection in each of the actual scale value candidates are associated with each other. Accordingly, necessary resolution estimation section 105 calculates a target value of the resolution on the basis of the actual scale prediction value calculated in pupil state prediction section 103 and the necessary resolution corresponding to the actual scale prediction value using the resolution table.

Table storage section 106 retains the above described resolution table. The resolution table is a table associating a plurality of pupil diameters with a resolution which is calculated preliminarily by experiment, simulation or the like and necessary for stably detecting the pupil having each of the pupil diameters. The resolution table is generated, for example, by a process of photographing an image of each pupil diameter in a plurality of resolutions, selecting a resolution providing the best pupil detection result in the images of the respective resolutions, and associating the resolution with the pupil diameter as a pupil resolution of each pupil diameter.

Eye area image normalization section 107 calculates a scale-up/scale-down factor on the basis of the resolution target value calculated in necessary resolution estimation section 105 and the eye area actual scale value calculated in eye area actual size calculation section 102. Specifically, eye area image normalization section 107 calculates the number of pixels per unit length on the basis of the eye area actual scale value calculated in eye area actual size calculation section 102 and the number of pixels used for the eye area image acquired from eye area image acquisition section 101, and calculates the scale-up/scale-down factor by obtaining a ratio of the calculated number of pixels per unit length and the resolution target value calculated in necessary resolution estimation section 105.

Then, eye area image normalization section 107 normalizes the eye area image acquired from eye area image acquisition section 101 on the basis of the calculated scale-up/scale-down factor. The eye area image normalized here (i.e., normalized eye area image) is output to pupil detection section 108.

Further, eye area image normalization section 107 calculates an actual size value of the eye area in the normalized eye area image and outputs the actual size value to pupil actual size calculation section 109.

Pupil detection section 108 detects a pupil image from the normalized eye area image acquired from eye area image normalization section 107. Coordinates of a pupil center and a pupil diameter in the detected pupil image are output to a line-of-sight detection section (not shown in the drawing) and pupil actual size calculation section 109, respectively.

Pupil actual size calculation section 109 calculates a pupil actual size from the eye area actual size value in the normalized eye area image acquired from eye area image normalization section 107 and the pupil diameter acquired from pupil detection section 108. This actual size pupil diameter is retained in actual size pupil diameter storage section 104.

Operation of Pupil Detection Apparatus 100

Figure 3:
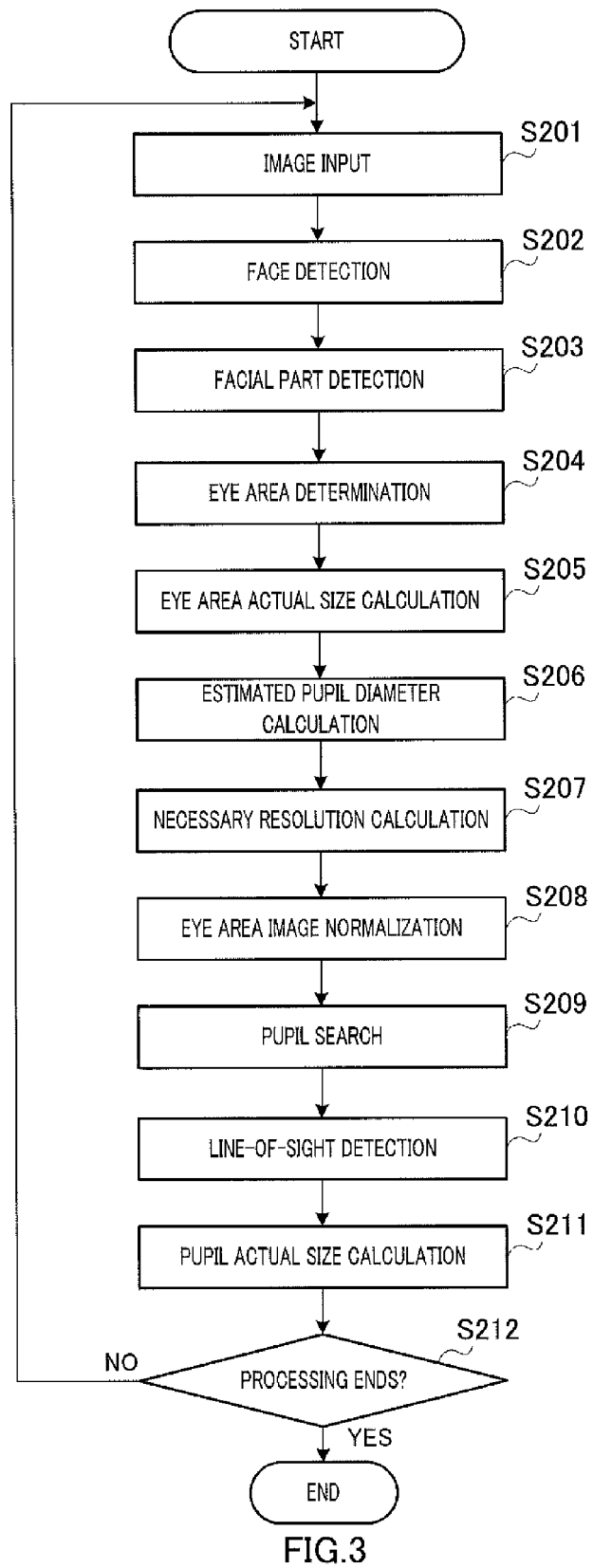
FIG. 3 is a flowchart for explaining operation of a pupil detection apparatus.

Operation of pupil detection apparatus 100 having the above configuration will be explained. FIG. 3 is a flowchart for explaining the operation of pupil detection apparatus 100. The flowchart of FIG. 3 includes a processing flow in the above described line-of-sight detection apparatus.

The processing flow shown in FIG. 3 starts together with the start of photographing work. The photographing work may be started by user operation or may be started with any external signal as a trigger.

<Image Acquisition Processing>

In step S201, image input section 111 captures an image of an imaging target (i.e., person, here). Thereby, a target image is acquired.

Image input section 111 is a digital camera provided with a CMOS image sensor and a lens, for example. Accordingly, an image which is captured in image input section 111 and has the PPM (Portable Pix Map file format) format or the like is temporarily stored in an unillustrated image storage section (e.g., memory space of a PC) which is included in image input section 111, and then output to eye area detection section 112, while keeping the PPM format.

<Face Image Detection Processing>

Figure 4:
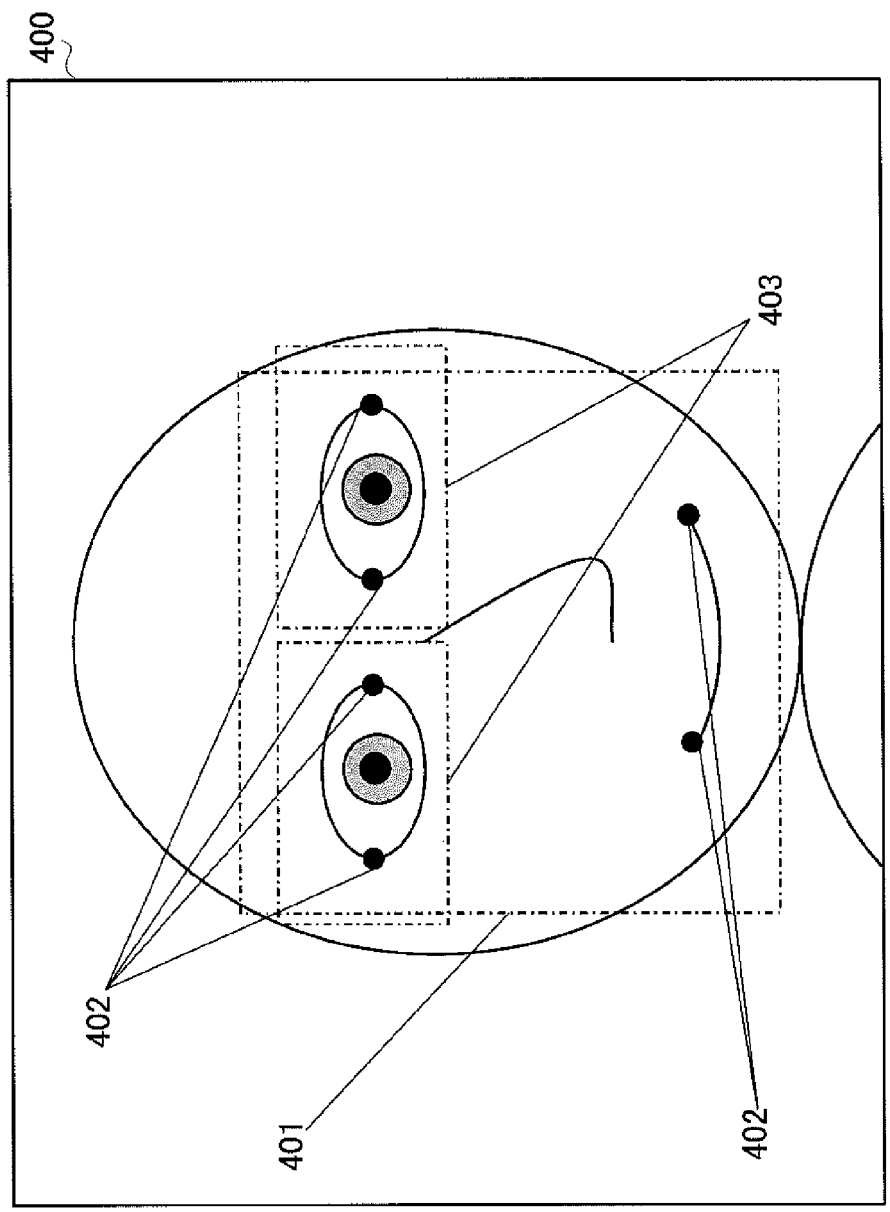
FIG. 4 is a diagram showing a face image which is a target image.

In step S202, face detection section 121 detects a face image from the target image acquired from image input section 111. FIG. 4 is a diagram showing the face image as the target image. Note that, in the captured face image, an image horizontal direction is assumed to be an X axis, an image vertical direction is assumed to be a Y axis, and one pixel is assumed to correspond to one coordinate point, for example.

The face area detection processing, for example, extracts a candidate for characteristic image (i.e., characteristic image candidate) from the target image, compares the extracted characteristic image candidate with a preliminarily prepared characteristic image expressing a face area, and thereby detects a characteristic image candidate having a high similarity. The similarity is obtained by a method of collating a preliminarily acquired Gabor feature amount of an average face and a Gabor feature amount extracted by scanning the target image, and calculating an inverse of an absolute value of difference therebetween, for example.

In this case, face detection section 121 extracts a face area candidate group in image 400 of FIG. 4, compares the extracted face area candidate group with a preliminarily prepared template, and detects a face area candidate having the highest correlation as face image 401. Note that the face area detection processing may be performed by detecting a flesh color area from within the image (i.e., flesh color area detection), by detecting an ellipsoidal part (i.e., ellipsoid detection), or by using a statistical pattern recognition method. Any other method may be employed if the technique can perform the above described face detection.

<Facial Part Detection Processing>

In step S203, facial part detection section 122 detects a facial part group (i.e., mouth corner, eye tail, eye inner corner, etc.) from the face image acquired from face detection section 121, and outputs positional coordinates of each facial part to eye area determination section 123. A search area of the facial part group is face image 401 specified in step S202. FIG. 4 shows each part of facial part group 402.

The facial part group detection processing detects two-dimensional coordinates of an end point of a facial part such as a mouth corner, eye tail, and eye inner corner, a nostril, or the like using a separability filter, for example. Further, a learning section is caused to preliminarily learn an association relationship between a plurality of face images and facial part positions corresponding to the face images, and facial part detection section 122 may detect a part having the highest likelihood in the association relationship as a facial part when face image 401 is input. Alternatively, facial part detection section 122 may search face image 401 for a facial part using a template of a typical facial part.

<Eye Area Determination Processing>

In step S204, eye area determination section 123 determines an eye area from the face image acquired from face detection section 121 and the facial part group acquired from facial part detection section 122.

The eye area determination processing determines rectangular area 403 including an eye tail and eye inner corner as an eye area for each of the right and left eyes, for example, and acquires left-and-upper end point coordinates and right-and-lower end point coordinates of the rectangle as an eye area detection result. Here, the left-and-upper end point coordinates and the right-and-lower end point coordinates of the rectangle are used as a parameter showing a position and a size of the eye area.

<Eye Area Actual Size Calculation Processing>

In step S205, eye area actual size calculation section 102 calculates an actual scale value of the eye area from eye area image data (stereo image data in Embodiment 1) acquired from eye area image acquisition section 101. Specifically, eye area actual size calculation section 102 calculates a feature distance (number of pixels) p between feature points on the image from the eye area image data. This feature distance between the feature points on the image is a distance between an eye tail and an eye inner corner on the image, for example. Then, eye area actual size calculation section 102 calculates x/p by divided reference distance x by the feature distance p. Reference distance x is an average distance between the eye tail and the eye inner corner (e.g., 28 mm), for example, in a real space. Therefore, x/p expresses an actual size value corresponding to one pixel.

<Estimated Pupil Diameter Calculation Processing>

In step S206, pupil state prediction section 103 calculates an actual scale prediction value of a pupil diameter.

Specifically, pupil state prediction section 103 predicts an actual size of a pupil included in the eye area image acquired from eye area image acquisition section 101 on the basis of a past actual size pupil diameter retained in actual size pupil diameter storage section 104. For example, pupil state prediction section 103 calculates actual scale prediction value $D_t$ of the pupil diameter by equation 1 when an actual size pupil diameter one-frame previous is denoted by $D_{t-1}$ and an actual size pupil diameter two-frame previous is denoted by $D_{t-2}$.

[1]

$$D_t = D_{t-1} + (D_{t-1} - D_{t-2}) \quad \text{(Equation 1)}$$

Alternatively, pupil state prediction section 103 may calculate actual scale prediction value $D_t$ of the pupil diameter by equation 2. In equation 2, $V_m$ is an average human miosis (here, indicating that a pupil becomes small) rate.

[2]

$$D_t = D_{t-1} + V_m((t - (t-1))) \quad \text{(Equation 2)}$$

Alternatively, pupil state prediction section 103 may perform the state prediction using a Kalman filter or the like.

<Necessary Resolution Calculation Processing>

In step S207, necessary resolution estimation section 105 calculates a resolution target value on the basis of the actual scale prediction value calculated in pupil state prediction section 103. The calculation of the resolution target value uses the resolution table stored in table storage section 106. This resolution table associates an actual scale value candidate group of the pupil diameter and image resolutions necessary for the pupil detection in the respective actual scale value candidates.

Figures 5A, 5B:
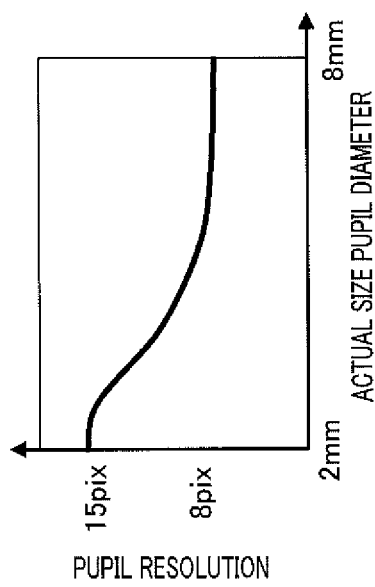
FIGS. 5A and 5B are diagrams showing an example of a resolution table.

The resolution table stored in table storage section 106 may be retained in a graph format as shown in FIG. 5A or may be retained in a table format as shown in FIG. 5B. A tendency characteristic of the resolution table is as follows. (1) As an actual size pupil diameter (i.e., actual scale value candidate) is smaller, a value of the corresponding necessary resolution becomes larger. (2) The necessary resolution decreases monotonically to the actual scale value candidate and converges to a certain value.

Specifically, necessary resolution estimation section 105 calculates resolution target value b/a on the basis of actual scale prediction value a calculated in pupil state prediction section 103 and necessary resolution b corresponding to the actual scale prediction value, using the resolution table. Resolution target value b/a is the number of pixels per actual size unit length, which is necessary to stably detect the pupil having a predicted pupil diameter.

<Eye Area Image Normalization Processing>

In step S208, eye area image normalization section 107 calculates a scale-up/scale-down factor on the basis of the resolution target value calculated in necessary resolution estimation section 105 and the eye area actual scale value calculated in eye area actual size calculation section 102. Specifically, eye area image normalization section 107 calculates the number of pixels per unit length on the basis of the eye area actual scale value calculated in eye area actual size calculation section 102 and the number of pixels used in the eye area image acquired from eye area image acquisition section 101, and calculates the scale-up/scale-down factor by obtaining a ratio of the calculated number of pixels per unit length and the resolution target value calculated in necessary resolution estimation section 105.

Then, eye area image normalization section 107 normalizes the eye area image acquired from eye area image acquisition section 101 on the basis of the calculated scale-up/scale-down factor. This scale-up/scale-down processing uses a method used in typical image processing such as a bilinear method and a bicubic method.

<Pupil Search Processing>

In step S209, pupil detection section 108 detects a pupil image from the normalized eye area image acquired from eye area image normalization section 107. Pupil center coordinates and a pupil diameter in the pupil image are output to the line-of-sight detection section (not shown in the drawing) and pupil actual size calculation section 109, respectively.

In step S210, the line-of-sight detection section (not shown in the drawing) calculates a line-of-sight direction from a face direction vector expressing a face front direction which is calculated from the coordinates of facial part group 402 and a line-of-sight direction vector relative to the face front direction which is calculated from the coordinates of the eye tail, eye inner corner and pupil center, for example.

The face direction vector is calculated in the following sequence, for example. First, preliminarily acquired three-dimensional coordinates of a driver's facial part group are converted by rotation and translation. Then, the converted three-dimensional coordinates are projected to the target image used in the pupil detection. Then, a rotation-translation parameter which matches the facial part group detected in step S203 in the highest degree is calculated. In this case, when the three-dimensional coordinates of the driver's facial part group is acquired preliminarily, a combination of a vector expressing a direction of the driver's face and a vector rotated by the determined rotation parameter is the face direction vector.

Further, the line-of-sight direction vector is calculated in the following sequence, for example. First, when the face is directed in a predetermined direction, the driver's facial part group and three-dimensional coordinates of the pupil center when the driver sees the same direction as the face direction are stored preliminarily. Detection of the pupil center is performed by obtaining a centroid of pixels having a brightness not higher than a predetermined brightness in the eye area, for example. Next, a position apart from the three-dimensional coordinates of the detected pupil in a direction opposite to the line-of-sight direction by a predetermined distance is calculated as an eye ball center position. In this case, while the above described predetermined distance is set appropriately to be approximately 12 mm which is an eye ball radius of a typical adult human, the distance is not limited to the above described value and an optional value may be used. Next, the three-dimensional coordinates of the eye ball center at the time of detection is calculated by the use of the face rotation-translation parameter acquired in the face direction vector calculation. Next, the pupil is assumed to exist on a sphere which has the center at the eye ball center and a radius of the above described predetermined distance, and it is searched for at what position on the above described sphere the detected pupil center exists. Lastly, a vector connecting the eye ball center and the point searched for on the sphere is calculated as the line-of-sight direction.

<Pupil Actual Size Calculation Processing>

In step S211, pupil actual size calculation section 109 calculates a pupil actual size from the eye area actual size value in the normalized eye area image acquired from eye area image normalization section 107 and the pupil diameter acquired from pupil detection section 108.

Actual size $D_{rt}$ of the pupil is calculated by equation 3 when a scale-up/scale-down factor of the normalized eye area image is denoted by n and a pupil diameter on the normalized eye area image of the detected pupil is denoted by $D_n$. This actual size pupil diameter is retained in actual size pupil diameter storage section 104.

(Equation 3)

$$D_{rt} = \frac{D_n x}{np} \quad [3]$$

<End Determination Processing>

In step S212, end determination is performed. The end determination may be performed by manual input of an end instruction or may be performed by pupil detection apparatus 100 with any external signal as a trigger.

When the processing is determined to be ended in step S212, the processing of FIG. 3 ends.

As described above, according to the present embodiment, in pupil detection apparatus 100, necessary resolution estimation section 105 calculates the resolution target value on the basis of the actual scale prediction value calculated by pupil state prediction section 103. Then, eye area image normalization section 107 calculates the scale-up/scale-down factor on the basis of the resolution target value calculated by necessary resolution estimation section 105 and the eye area actual scale value acquired by eye area actual size calculation section 102, and normalizes the eye area image on the basis of the calculated scale-up/scale-down factor. Then, pupil detection section 108 detects the pupil image from the eye area image normalized by eye area image normalization section 107.

Thereby, it is possible to perform the pupil detection using the normalized image scaled-up/scaled-down from the eye area image by the use of the scale-up/scale-down factor which is calculated on the basis of the actual scale prediction value of the pupil diameter and the eye area actual scale value and reflects actual conditions, and therefore it is possible to improve the pupil detection accuracy even when an image to be detected has a low resolution.

Further, eye area image normalization section 107 calculates the number of pixels per unit length on the basis of the eye area actual scale value and the number of pixels used in the eye area image, and calculates the scale-up/scale-down factor by obtaining a ratio of the calculated number of pixels per unit length and the resolution target value.

Note that, in the above explanation, assuming that the target value of the resolution is an ideal resolution, a value corresponding to the current resolution is explained as the eye area actual scale value. However, the present invention is not limited to this case, and there may be used an actual scale value in an area which is a peripheral area of the pupil and has a resolution not so much different from the resolution of the pupil image on the image.

Embodiment 2

In Embodiment 2, the eye area actual scale value is obtained by a distance sensor.

Figure 6:
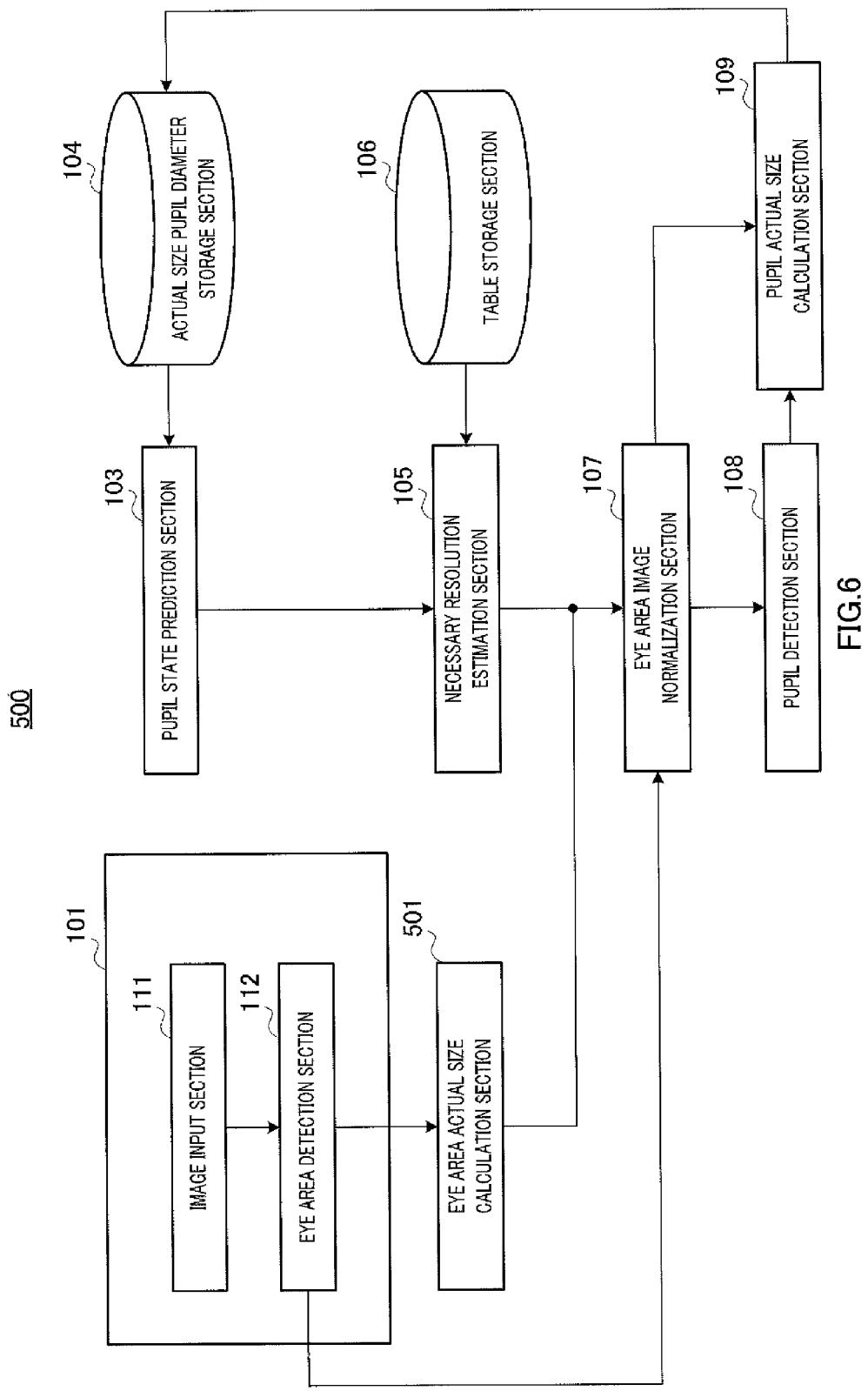
FIG. 6 is a block diagram showing a configuration of a pupil detection apparatus according to Embodiment 2 of the present invention.

FIG. 6 is a block diagram showing a configuration of pupil detection apparatus 500 according to Embodiment 2 of the present invention. In FIG. 6, pupil detection apparatus 500 includes eye area actual size calculation section 501.

Eye area actual size calculation section 501 includes a distance measuring sensor and detects the eye area actual scale value directly using the distance measuring sensor. The distance measuring sensor is a laser range sensor or a TOF (Time-Of-Flight) sensor, or the like, for example.

The detected eye area actual scale value is output to eye area image normalization section 107. Note that, as in Embodiment 1, the value corresponding to a current resolution is not limited to the eye area actual scale value but may be an actual scale value of a region which is a peripheral area of the pupil and has a resolution not so much different from the resolution of the pupil image on the image.

As described above, according to the present embodiment, in pupil detection apparatus 500, eye area actual size calculation section 501 includes the distance measuring sensor, and eye area image normalization section 107 calculates a scale-up/scale-down factor on the basis of a calculated resolution target value and an eye area actual scale value measured by the distance measuring sensor and normalizes the eye area image on the basis of the calculated scale-up/scale-down factor, and pupil detection section 108 detects a pupil image from the normalized eye area image.

Thereby, it is possible to detect the eye area actual scale value without using an image, and therefore it is possible to acquire a more accurate eye area actual scale value even when an image to be detected has a low resolution. As a result, it is possible to calculate the scale-up/scale-down factor on the basis of the more accurate eye area actual scale value and therefore it is possible to further improve the pupil detection accuracy.

Embodiment 3

In Embodiment 3, the calculation method for the actual scale prediction value of the pupil diameter is switched depending on an equilibrium state or a non-equilibrium state of illuminance.

Figure 7:
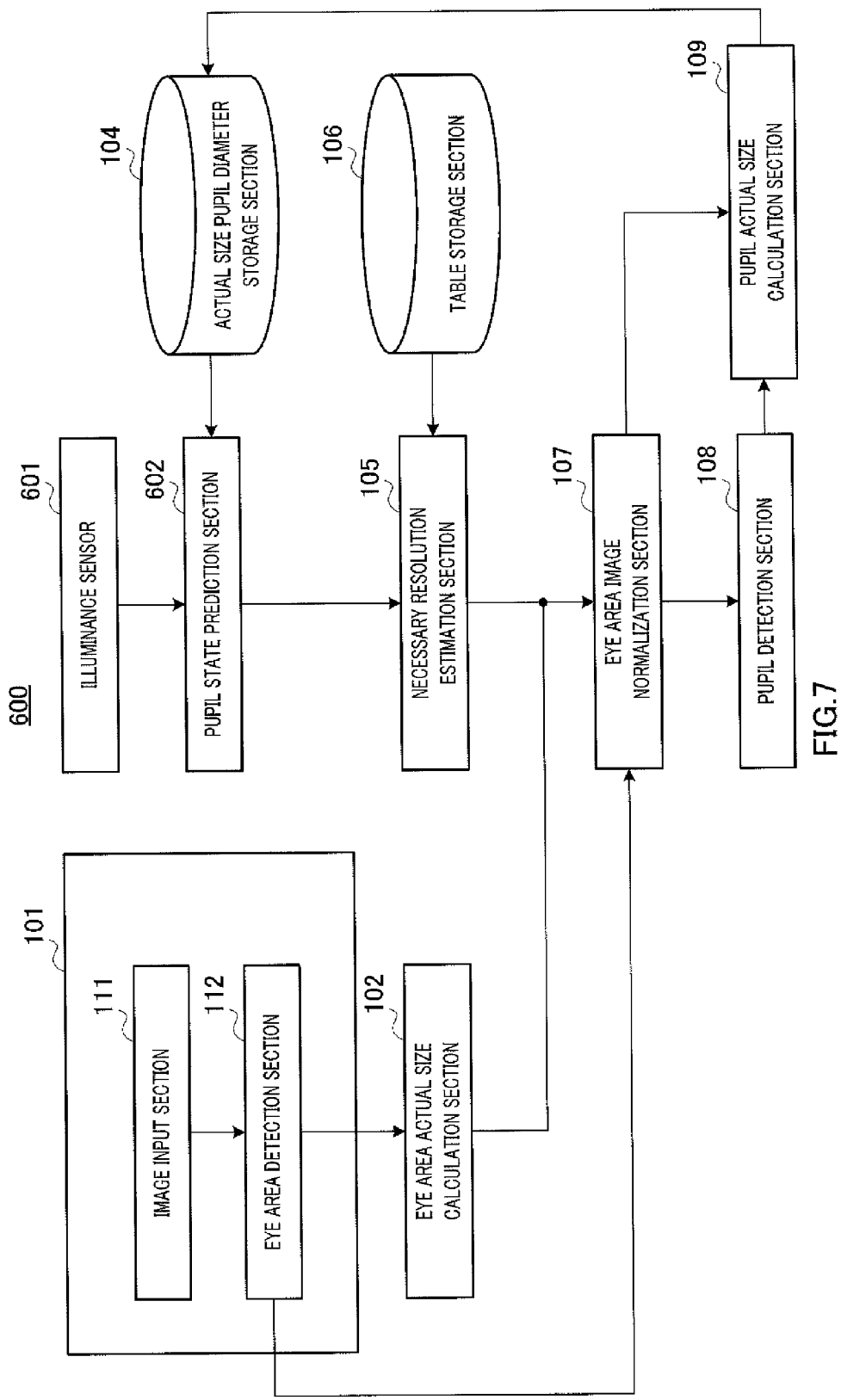
FIG. 7 is a block diagram showing a configuration of a pupil detection apparatus according to Embodiment 3 of the present invention.

FIG. 7 is a block diagram showing a configuration of pupil detection apparatus 600 according to Embodiment 3 of the present invention. In FIG. 7, pupil detection apparatus 600 includes illuminance sensor 601 and pupil state prediction section 602.

Illuminance sensor 601 measures illuminance in a peripheral of pupil detection apparatus 600 and an imaging target at a predetermined period, and outputs the measured illuminance sequentially to pupil state prediction section 602.

Pupil state prediction section 602 determines whether the illuminance is in an equilibrium state or non-equilibrium state, on the basis of a history of the illuminance measured in illuminance sensor 601, and switches the calculation method for the actual scale prediction value of the pupil diameter on the basis of the determination result.

Specifically, when determining that the illuminance is in the equilibrium state, pupil state prediction section 602 calculates the actual scale prediction value of the pupil diameter on the basis of at least two pupil diameters which were detected in the past in pupil detection section 108. That is, pupil state prediction section 602, when determining that the illuminance is in the equilibrium state, calculates the actual scale prediction value of the pupil diameter using the above described equation 1.

On the other hand, pupil state prediction section 602, when determining that the illuminance is in the non-equilibrium state, calculates the actual scale prediction value of the pupil diameter on the basis of a pupil diameter and a miosis rate which were detected in the past in pupil detection section 108. That is, pupil state prediction section 602, when determining that the illuminance is in the non-equilibrium state, calculates the actual scale prediction value of the pupil diameter using the above described equation 2.

In this manner, according to the present embodiment, pupil state prediction section 602 determines whether the illuminance is in a equilibrium state or a non-equilibrium state on the basis of the history of the illuminance measurement value, and switches the calculation method for the actual scale prediction value of the pupil diameter on the basis of the determination result.

Thereby, it is possible to calculate the actual scale prediction value of the pupil diameter by reflecting a photographing environment, and therefore it is possible to acquire a more accurate resolution target value even when an image to be detected has a low resolution. As a result, it is possible to calculate the scale-up/scale-down factor on the basis of the more accurate resolution target value, and therefore it is possible to further improve the pupil detection accuracy.

Although the above each embodiment has been explained using a case where the claimed invention is implemented with hardware, as an example, the claimed invention can be implemented with software.

Furthermore, each function block employed in the explanation of the above each embodiment may typically be implemented as an LSI constituted by an integrated circuit. These function blocks may be individual chips or partially or totally contained on a single chip. The term "LSI" is adopted herein but this may also be referred to as "IC," "system LSI," "super LSI," or "ultra LSI," depending on the differing extents of integration.

The method of implementing integrated circuit is not limited to LSI, and implementation by means of dedicated circuitry or a general-purpose processor may also be possible. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The pupil detection apparatus explained in each of the above described embodiments is effectively applied to an information terminal such as a personal computer, OA equipment, and a mobile phone, and an information provision apparatus mounted on a transportation means such as a car, an airplane, a ship, and an electric train. Further, the pupil detection apparatus can be also applied to monitoring equipment, an alarming apparatus, a robot, an image-sound reproduction apparatus, and the like.

The disclosure of Japanese Patent Application No. 2010-213780, filed on Sep. 24, 2010, including the specification, drawings and abstract, is incorporated herein by reference in its entirety.

INDUSTRIAL APPLICABILITY

The pupil detection apparatus and the pupil detection method of the present invention can improve a pupil detection accuracy even when an image to be detected has a low resolution.

REFERENCE SIGNS LIST 100, 500, 600 Pupil detection apparatus
101 Eye area image acquisition section
102, 501 Eye area actual size calculation section
103, 602 Pupil state prediction section
104 Actual size pupil diameter storage section
105 Necessary resolution estimation section
106 Table storage section
107 Eye area image normalization section
108 Pupil detection section
109 Pupil actual size calculation section
111 Image input section
112 Eye area detection section
121 Face detection section
122 Facial part detection section
123 Eye area determination section
601 Illuminance sensor

The invention claimed is:

1. A pupil detection apparatus comprising:
an acquisition section that acquires an actual scale value of a peripheral area including a pupil of a user, the actual scale value being calculated from an image of the peripheral area;
a first calculation section that calculates an actual scale prediction value of a pupil diameter of the user, based on a held actual scale prediction value of a previous pupil diameter of the user;
a second calculation section that calculates a first number of pixels per unit length which is a target value of resolution, based on a resolution table and the calculated actual scale prediction value of the pupil diameter, the resolution table associating data of a plurality of pupil diameters with data of resolutions which correspond to the plurality of pupil diameters respectively;
a normalization section that calculates a scale-up/scale-down factor based on the calculated first number of pixels per unit length, the acquired actual scale value of the peripheral area, and a number of pixels of an image of the peripheral area, and normalizes the image of the peripheral area based on the calculated scale-up/scale-down factor; and
a detection section that detects an image of the pupil from the normalized image of the peripheral area.

2. The pupil detection apparatus according to claim 1, wherein
the normalization section calculates a second number of pixels per unit length based on the actual scale value of the peripheral area and the number of pixels of the image of the peripheral area, and calculates the scale-up/scale-down factor by obtaining a ratio of the first number of pixels per unit length and the second number of pixels per unit length.

3. The pupil detection apparatus according to claim 1, wherein
the acquisition section includes a distance measuring sensor and measures an actual scale of the peripheral area with the distance measuring sensor.

4. A pupil detection apparatus comprising:
an acquisition section that acquires an actual scale value of a peripheral area including a pupil;
a first calculation section that determines whether illuminance is in an equilibrium state or a non-equilibrium state, based on a history of illuminance measured by an illuminance sensor, and calculates an actual scale prediction value of a pupil diameter, by a first method when the illuminance is in the equilibrium state or by a second method when the illuminance is in the non-equilibrium state;
a second calculation section that calculates a target value of resolution, based on the calculated actual scale prediction value;
a normalization section that calculates a scale-up/scale-down factor based on the calculated target value of resolution and the acquired actual scale value of the peripheral area, and normalizes an image of the peripheral area based on the calculated scale-up/scale-down factor; and
a detection section that detects an image of the pupil from the normalized image of the peripheral area.

5. A pupil detection method comprising:
acquiring an actual scale value of a peripheral area including a pupil of a user, the actual scale value being calculated from an image of the peripheral area;
calculating an actual scale prediction value of a pupil diameter of the user, based on a held actual scale prediction value of a previous pupil diameter of the user;
calculating a first number of pixels per unit length which is a target value of resolution, based on a resolution table and the calculated actual scale prediction value of the pupil diameter, the resolution table associating data of a plurality of pupil diameters with data of resolutions which correspond to the plurality of pupil diameters respectively;
calculating a scale-up/scale-down factor based on the calculated first number of pixels per unit length, acquired actual scale value of the peripheral area, and a number of pixels of an image of the peripheral area;
normalizing the image of the peripheral area based on the calculated scale-up/scale-down factor; and
detecting an image of the pupil from the normalized image of the peripheral area.

* * * * *